United States Patent [19]

Nelson et al.

[11] Patent Number: 4,959,925
[45] Date of Patent: Oct. 2, 1990

[54] APPARATUS AND METHOD FOR VAPORIZING ACTIVE SUBSTANCES

[75] Inventors: Kurt D. Nelson, Mt. Pleasant Township, Racine County; Joseph E. Sus, Racine; Edward J. Lazzeroni, Sr., Caledonia Township, Racine County; Timothy E. Zollers, Franklin, all of Wis.; Jimmy J. Hanko, Lexington, Ky.

[73] Assignee: S. C. Johnson & Son, Inc., Racine, Wis.

[21] Appl. No.: 419,791

[22] Filed: Oct. 11, 1989

[51] Int. Cl.$^5$ .......................................... A01M 13/00
[52] U.S. Cl. .......................................... 43/125; 43/127
[58] Field of Search .................. 43/125, 126, 127, 128, 43/129, 130

[56] References Cited

U.S. PATENT DOCUMENTS

| | | | |
|---|---|---|---|
| 2,765,579 | 10/1956 | Gordon | 43/127 |
| 3,795,999 | 3/1974 | Tabita | 43/127 |
| 3,796,002 | 3/1974 | Katsuda | 43/125 |
| 3,807,082 | 4/1974 | Hautmann et al. | 43/125 |
| 4,126,958 | 11/1978 | Yokoyama | 43/127 |
| 4,839,144 | 6/1989 | Martin | 43/127 |

Primary Examiner—Richard K. Seidel
Assistant Examiner—Rex E. Pelto

[57] ABSTRACT

A simple and inexpensive ventilated support stand, which can be assembled from a single pre-cut blank, into which a formed stick of combustible material containing an active insecticidal ingredient may be inserted and suspended for combustion and vaporization of the active ingredient. The stand is preferably made from a foil and paper laminate and can be shipped and stored flat and partially assembled then fully assembled by the user.

10 Claims, 2 Drawing Sheets

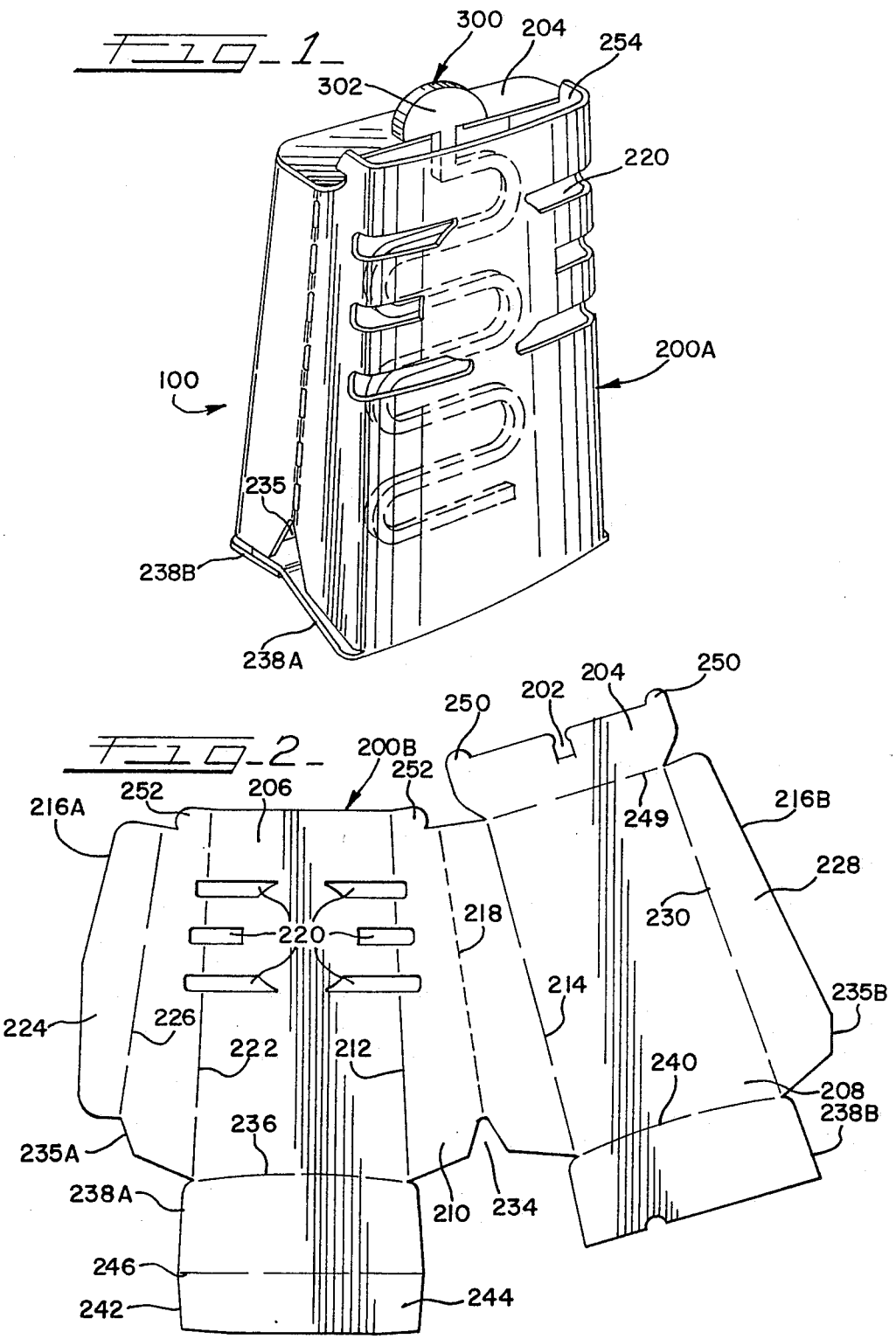

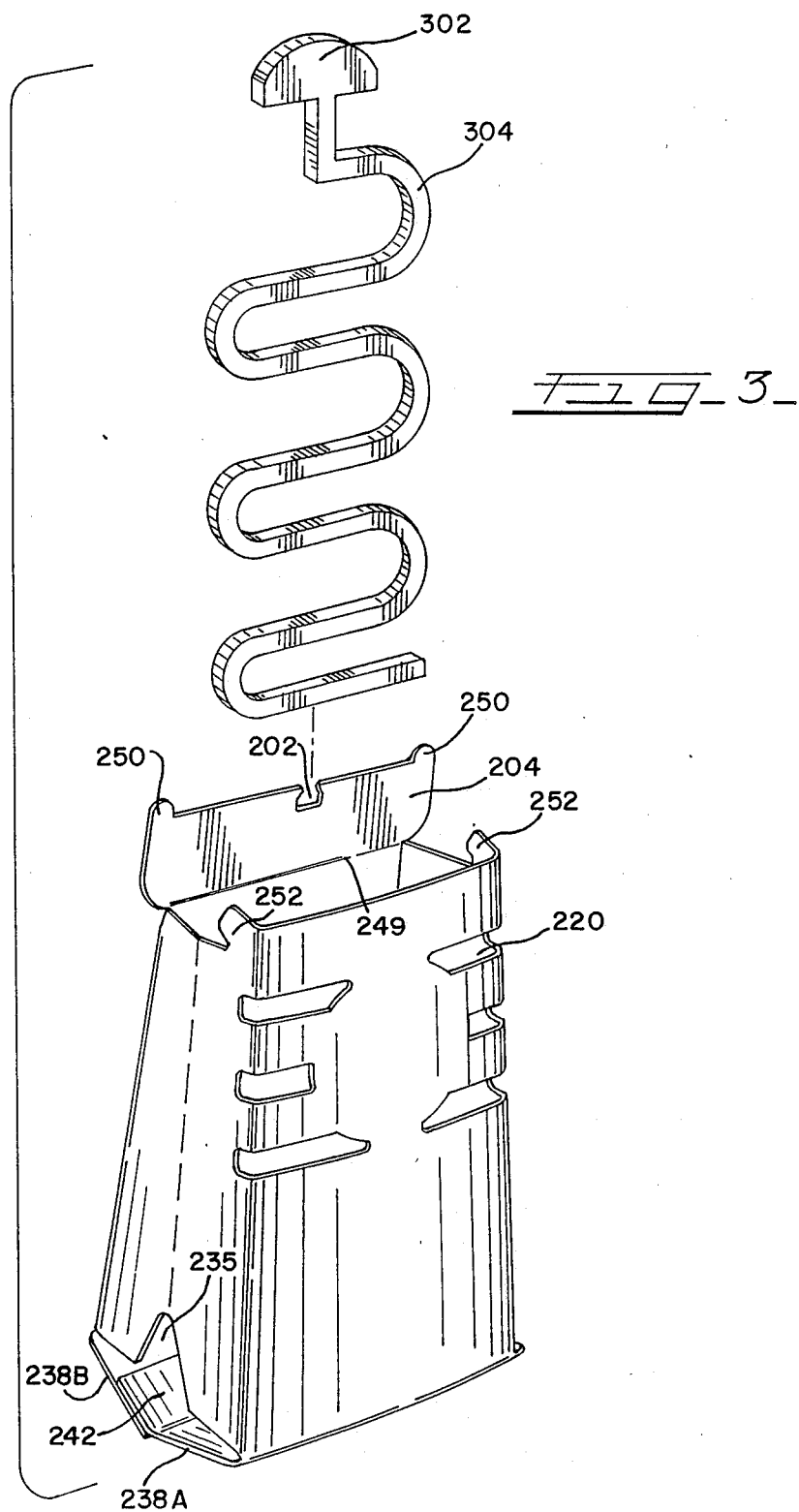

APPARATUS AND METHOD FOR VAPORIZING ACTIVE SUBSTANCES

TECHNICAL FIELD

This invention relates to the field of vaporizing devices and more particularly to a ventilated support stand in which an ignited combustible stick containing an active ingredient may be suspended.

BACKGROUND ART

The fact that a combustible material may be ignited and then will release an active, vaporizable ingredient as it continues to smolder is well known. Incense sticks and mosquito coils are only two examples of types of formed combustible materials. The most direct approach to igniting such an item is to place the stick or coil on a non-flammable surface and ignite it. The main disadvantages of such an approach are obvious: the smoldering coil can be directly touched by humans or animals, and, if it is knocked over and contacts a flammable material such as paper, it may cause a fire.

Thus, various types of holders have been developed. Such holders are usually designed to both enclose the ignited combustible material and to diffuse the emitted vapors. The majority of such holders have been designed as incense burners. A frequent design is a footed deep bowl-like structure with a cover with vent holes. A block or cone of incense is burned in the covered bowl, often on a bed of sand or other substance that both supports and insulates the burning incense, while smoke escapes through the holes in the cover.

Protective support devices for holding ignited mosquito coils are also known. One such device is described in U.S. Pat. No. 3,796,002 to Katsuda, Can for Mosquito Coils. This patent discloses a can having an inner lid with openings there through and a top lid with a wire screen across the inside of the top lid. Mosquito coils may be stored with the can. When the user wishes to burn a mosquito coil, he removes one from the can, inverts the upper lid upon the can body to form a support for the coil, and places the top lid over the ignited coil.

Another device for burning mosquito coils is disclosed by U.S. Pat. No. 4,126,958 to Yokoyama, Fumigator for Mosquito Coil. This patent discloses a two part closeable container, with a solid dish-shaped body portion and an apertured lid portion. Each portion has a net of glass fibers placed over and within its inner surface. The ignited mosquito coil is placed upon one of the nets and the container then closed.

Both of the devices described above, while they accomplish the dual purpose of improving the combustion of the coil while preventing undesired contact—by either users or flammable materials—with the ignited coil, are complicated and therefore relatively expensive structures.

An extremely simple and inexpensive support for an ignited mosquito coil, is disclosed by U.S. Pat. No. 2,765,579 to Gordon, Insect Repellent Device. This patent discloses a foldable container that holds a mosquito coil supported by a spring over an area of heat-reflective material upon the inside surface of the container. While this device is simpler and cheaper than the containers discussed previously, it lacks any type of protective covering over the ignited coil. It is also a one-use package.

What is not disclosed by the prior art is a simple, inexpensive yet reuseable support stand for an ignited stick of a combustible substance containing an active ingredient, a stand that also has protective features.

SUMMARY DISCLOSURE OF THE INVENTION

The present invention provides an extremely simple support stand which can be fabricated from a single blank of flat material, partially assembled and collapsed to be stored, and for shipping and sale, and easily assembled by the user. The assembled support stand has a base, face and side panels with ventilating openings therein, and a top which both forms a chimney opening for the stand and has a holding opening into which a stick of combustible material containing an active ingredient which has a support means at one end may be placed after it is ignited. The support stand has on its inner surface a heat-reflective material, and the ignited stick of combustible material hangs from the top of the stand down into the interior of the stand. Vapors from the burning stick escape through the ventilating holes and through the chimney, but the burning stick cannot be directly touched by humans or animals.

BRIEF DESCRIPTION OF THE DRAWINGS

FIG. 1 is a perspective drawing of the assembled support stand with the combustible stick (indicated by broken lines where it would otherwise be invisible within the stand) held therein.

FIG. 2 is a top plan view of the pre-formed blank from which the stand is assembled.

FIG. 3 is a perspective drawing of the partially assembled stand showing the stick of combustible material oriented for placement into the stand.

DESCRIPTION OF THE PREFERRED EMBODIMENT OF THE INVENTION

FIG. 1 shows apparatus 100 which has two major components: support stand 200A and stick of combustible material 300. When support stand 200A is assembled from the support stand blank 200B, shown in FIG. 2, stick of combustible material 300 is supported by enlarged head 302 which fits into top notch 202 in top flap 204 of support stand 200A so that the main body or tail 304 of stick of combustible material 30 hangs suspended within support stand 200A.

As shown in FIG. 2, from support stand blank 200B has four panels: first face panel 206, second face panel 208, first side panel 210, which is joined along its outer edges at first face fold line 212 and second face fold line 214 to first face panel 206 and second face panel 208 and second side panel 216, which is formed from first side flap 216A and second side flap 216B. First panel fold line 218 vertically bisects first side panel 210. The fold lines of the present invention may be scored or otherwise weakened for ease of assembly of the apparatus.

In this embodiment of the invention, first face panel 206 has two mirror-image series of ventilation openings 220 extending across its outer edges and respectively into first side panel 210 and second side panel 216. On one side of first face panel 206, ventilation openings 220 extend from first face panel 206 into first side panel 210 and on the opposite side of first face panel 206, from first face panel 206 into first side flap 216A. First side flap 216A adjoins first face panel 206 along third face fold line 222. First side flap 216A itself has, located on the opposite side of first side flap 216A from first face panel 206, side attachment flap 224, Which is joined to second face panel 208 by side attachment flap fold line 226.

Running along the opposite side of second face panel 208 from first side panel 210 is fourth face fold line 230, which joins second side flap 216B to second face panel 208. Second side flap 216B has on its upper surface panel glue 228 (or other attachment means). Side attachment flap 224, when stand 200A is assembled, is connected to second side flap 216B by panel glue 228 (or other attachment means) to form second side panel 216 for support stand 200A.

First side panel 210 has cut into its lower edge first updraft opening 234, which, when support stand 200A is assembled and the ignited stick of combustible material 300 suspended therein, provides an opening for air to enter support stand 200A near its base to create an updraft.

Side attachment flap 224 and second side flap 216B have corresponding first angle cut 235A and second angle cut 235B which, when side attachment flap 224 and second side flap 216B are joined to form the second side panel of support stand 200A, form second updraft opening 235.

Located at the bottom of first face panel 206, and separated therefrom by first base fold line 236, is first base flap 238, which has, located on the opposite side of first base flap 238 from first face panel 206, and separated therefrom by second base fold line 240 is base attachment flap 242. Base attachment flap 242 has base glue 244 along a portion its upper surface.

Along the bottom edge of second face panel 080 and separated therefrom by second base fold line 240 is second base flap 248. When support stand 200A is assembled, base attachment flap 242 is attached by means of base glue 244 (or other attachment means) to second base flap 238B to form the bottom portion of the stand.

At the upper end of second face panel 208 and divided therefrom by top fold line 249 is top flap 204, which has therein top notch 202 and a pair of top flap tabs 250 located at the outer ends thereof. First side panel 210 and first side flap 216A have, toward their respective upper ends, a pair of side panel tabs 252.

Support stand 200A is preferably formed with a fire retardant material coating its interior surface. Most preferably, support stand blank 200B is cut from a paperboard or thick paper and metallic foil laminate and descriptive labelling is applied to the non-foil surface, which, upon assembly of support stand 200A, will form its exterior surface.

FIG. 3 shows stick of combustible material 300 oriented above support stand 200A, which is shown in a partially assembled state. The support stand base 238, of support stand 200A which has been assembled from first base flap 238A and second base flap 238B is shown V'd outwardly from the body of support stand 200A. When support stand 200A is fully assembled, the V will be inverted, with base attachment fold line 236 slightly raised relative to the plane defined by first base fold line 238 and second base fold line 240 within the interior of support stand 200A.

Top flap 204 of support stand 200A is shown in its open configuration. When support stand 200A is fully assembled, top flap 204 will be bent down at an essentially right angle to the body of support stand 200A, and top flap tabs 250 of top flap 204 are fitted under corresponding side panel tabs 252, as shown in FIG. 1. Top flap 204 only partially reaches across distance between the top portion of first face panel 206 and the top portion of second face panel 208.

Gap 254 thus created both allows the insertion of stick of combustible material 300 into support stand 200A and acts as a chimney, allowing air to enter support stand 200A through first updraft opening 234 and second updraft opening 235, move upward past stick of combustible material 300 and exit through gap 254 (as well as through ventilation openings 220). This provides an induced air flow which aids the burning of stick of combustible material 300 when it has been ignited.

Stick of combustible material 300 is formed from a combustible substance with appropriate binders and contains an active ingredient, such as an insect repellent or a fragrance. Stick of combustible material 300 is formed with an enlarged head 302 at one end, and tail 304. Tail 304 can be an elongated shape such as the series of S-curves, as shown, both to allow for a greater amount of material to be contained within a given length of stick of combustible material 300 and to allow head-to-tail manufacturing and packaging of the sticks.

Stick of combustible material 300 is ignited by the application of a match or other ignition device to the end of tail 304. When stick of combustible material 300 has caught fire, any flame is blown out and stick of combustible material 300 is inserted into gap 254 of support stand 200A so that tail 304 hangs down within support stand 200A. Enlarged head 302 is fitted into top notch 202 so that stick of combustible material 300 hangs from top flap 204.

Smoke from burning or smoldering stick of combustible material 300 escapes from support stand 200A through ventilation openings 220 and through gap 254. Once apparatus 100 is steadily emitting vapors, it may be placed where its effect is desired. If stick of combustible material 300 has as its active ingredient a mosquito or other insect repellent compound, it has been found that spacing the apparatus in the area to be protected at a distance of 6–8 feet apart is effective to repel mosquitos from the area. Any insect repellent compound which can be dispensed from a mosquito coil or similar device can be used.

BEST MODE FOR CARRYING OUT THE INVENTION

Sticks of the preferred embodiment of the invention contain as the active ingredient, the insect repellent Esbiothrin, and are made up according to the following formula:

|  | WT % |
|---|---|
| Sawdust Blend (100–200 mesh) | 79.950 |
| Staley Staloc 600 starch | 18.980 |
| Potassium Nitrate | .960 |
| Benzoic Acid | .310 |
| Butylated Hydroxytoluene | .370 |
| Brilliant Green (dye) | .190 |
| Esbiothrin (95.7%) | .157 |
| Water | 8.080 |
| Total | 100.000 |

The particular formulation of the repellent stick is not critical so long as the stick will burn and release the active ingredient. Combustible sticks containing an active, vaporizable ingredient to be used in the present invention may be made according to any known method of forming such sticks, so long as they have the appropriate combustion and configuration characteristics to be used in the apparatus of the present invention.

Optionally, a fragrance ingredient can be added to a composition such as that given above. The sticks of this composition are formed according to the following procedure:

1. Sawdust blend, starch, benzoic acid, BHT, and green dye are placed into a blender and dry mixed for ten minutes.
2. Potassium nitrate is dissolved into water at 100° F. with high speed agitation, and the mixture sprayed into the sawdust blend of step one with continuous blending.
3. Esbiothrin is sprayed into the resulting mixture, which is then blended continuously for 1 hour.
4. The material is extruded from an extrusion press.
5. The shaped mosquito sticks are die-cut from the extruded material.
6. Die-cut sticks are placed onto a drying screen and dried in an oven at 100° F. for 6-8 hours.

The support stand of the preferred embodiment of the present invention is formed from a metallic foil and paper board laminate which is die cut to the appropriate configuration and has strips of adhesive glue applied to the base and panel attachment flaps, and the support stand partially assembled with the foil upon its interior surface, then opened and assembled for use by the user as described above.

The relative sizes and configuration of the base vents and chimney opening of the support stand and of the thickness and length of the stick of combustible material are critical to the functioning of the apparatus to provide the appropriate combustion time. The relative sizes of the ventilation openings are less critical.

To achieve the preferred burn time of 3–3½ hours, the preferred embodiment of the support stand has an overall size of approximately 8½ cm. across its face panel bases, 7 cm. across its side panel bases, 7 cm. across its face panel tops, 3½ cm. across its side panel tops. It has updraft openings of approximately 1½ cm. across the base which taper to a point at a height of approximately 1½ cm. The chimney gap is approximately 1 cm. wide by an overall length of approximately 7 cm. The stick of combustible material has an overall length of approximately 13 cm. and measures approximately 5 cm. across the width of the S-curves, with a width and length of the stick itself each approximately ½ cm.

INDUSTRIAL APPLICABILITY

The apparatus of the present invention is intended for use in an outdoor environment with little or no breezes to dispel the emitted vapors. In such an area, the apparatus can be used as an insect repellent or to emit a fragrance. The same stand could be used for either purpose with a change in the stick of combustible material to one containing a different active ingredient.

Other modifications of the apparatus and method for vaporizing active substances of the present invention will become apparent to those skilled in the art from an examination of the above patent Specification and drawings. Therefore, other variations of the present invention may be made which fall within the scope of the following claims even though such variations were not specifically discussed above.

What is claimed is:

1. An apparatus for vaporizing insecticidally active substances comprising:

an elongated stick of a combustible substance containing an active insecticidal ingredient, having at one end thereof a support means, and a hollow support stand designed to accept the stick of combustible material, the support stand having a first and a second face panel, a first and a second side panel, a base portion, and a top portion, the top portion having therein holding means into which the support means of the stick of combustible material may be placed so that the stick hangs downward into the interior of the support stand, without contact with the face or side panels of the support stand, the support stand having one or more ventilation openings formed into one or more of its face panels and one or more updraft openings formed into one or more of its side panels, and the top portion incompletely covering the top of the support stand so as to form a chimney opening for the support stand.

2. A device according to claim 1 wherein said first side panel has a medial fold line running in the same direction as the first and second side edges of the first and second face panels, the second side flap has a medial fold line running in a similar direction, and the base has a medial fold line running parallel to the bottom of the face panels.

3. A device according to claim 1 wherein the ventilation apertures of the support stand comprise one or more apertures toward the top portions of one or more of the faces of the support stand and one or more openings formed toward the base portion of one or more of the side panels of the support stand.

4. A device according to claim 1 wherein the support stand is formed from a foil and paper laminate, with the foil side of the laminate forming the interior surface of the support stand.

5. The device according to claim 1 wherein the first side panel is essentially trapezoidal in shape, having its base edge of greater length than its top edge, and the first and second side flaps are so configured that the second side panel formed by the attachment of the first and second side flaps has a substantially similar trapezoidal shape.

6. A device according to claim 1 wherein the active ingredient in the stick of combustible material is an insect repellent.

7. A device according to claim 1 wherein the enlarged support portion of the stick of combustible material is formed from the same material as the body of the stick.

8. A device according to claim 1 wherein the stick of combustible material is formed into a series of S-shaped curves.

9. A device according to claim 1 wherein the relative sizes of the ventilation openings, the chimney gap, and the size and configuration of the stick of combustible material are adjusted so that the ignited stick of combustible material will burn over a period of 3–3½ half hours.

10. A method of vaporizing an insecticidally active substance comprising:

assembling a hollow support stand designed to accept an elongated stick of combustible material containing an active ingredient, the stick having at one end thereof a support means, and a hollow support stand designed to accept the stick of combustible material, the support stand having two face panels, two side panels, a base portion, and a top portion, the top portion having therein holding means into which the support means of the stick of combustible material can be placed so that the stick hangs downward into the interior of the support stand, without contact with the face or side panels of the support stand, the support stand having one or more ventilating apertures formed into one or more of its face panels and one or more updraft openings formed into one or more of its side panels therethrough, and the top portion incompletely covering the top of the support stand so as to form a chimney opening for the support stand;

igniting one end of the stick of combustible material containing an active ingredient;

extinguishing the flame on the stick of combustible material so that the stick of combustible material continues to smolder and thereby continue to vaporize the active substance contained therein;

placing the stick of combustible material into the assembled support stand so that the stick of combustible material hangs downward within the support stand and is held in position by the interaction of the support means of the stick of combustible material and the holding means of the top portion of the support stand; and placing the support stand with the ignited and smoldering stick of combustible material containing an active substance in the area where the effect of the vaporized active ingredient is desired.

* * * * *